US007015909B1

(12) United States Patent
Morgan III et al.

(10) Patent No.: US 7,015,909 B1
(45) Date of Patent: Mar. 21, 2006

(54) EFFICIENT USE OF USER-DEFINED SHADERS TO IMPLEMENT GRAPHICS OPERATIONS

(75) Inventors: David L. Morgan III, Redwood City, CA (US); Ignacio Sanz-Pastor, San Francisco, CA (US)

(73) Assignee: Aechelon Technology, Inc., San Carlos, CA (US)

( * ) Notice: Subject to any disclaimer, the term of this patent is extended or adjusted under 35 U.S.C. 154(b) by 539 days.

(21) Appl. No.: 10/102,592

(22) Filed: Mar. 19, 2002

(51) Int. Cl.
*G06T 15/50* (2006.01)

(52) U.S. Cl. ...................................................... 345/426

(58) Field of Classification Search ................ 717/143, 717/145, 170, 173; 345/426, 584
See application file for complete search history.

(56) References Cited

U.S. PATENT DOCUMENTS 5,778,231 A * 7/1998 van Hoff et al. ............ 717/143
5,793,374 A * 8/1998 Guenter et al. ............. 345/426
6,771,264 B1 * 8/2004 Duluk et al. ................ 345/426

OTHER PUBLICATIONS

Segal, Mark and Akeley, Kurt. The OpenGL® Graphics System: A Specification (Version 1.2.1) [online]. Apr. 1, 1999 [retrieved on Aug. 19, 2002]. Partial: Cover—page x. Retrieved from the Internet:<URL: http://www.opengl.org/developers/documentation/Version1.2/OpenGL_spec_1.2.1.pdf>.

Akeley, Kurt et al. ARB_vertex_program (revision 34) [online]. Last modified Jul. 19, 2002 [retrieved on Aug. 19, 2002]. pp. 1-114. Retrieved from the Internet:<URL: http://oss.sgi.com/projects/ogl-sample/registry/ARB/vertex_program.txt>.

Kilgard, Mark J. NV_register_combiners (version 1.4) [online]. Feb. 6, 2002 [retrieved on Aug. 19, 2002]. pp. 1-25. Retrieved from the Internet:<URL: http://oss.sgi.com/projects/ogl-sample/registry/NV/register_combiners.txt>.

NV_register_combiners2 [online]. Apr. 13, 2001 [retrieved on Aug. 19, 2002]. pp. 1-5. Retrieved from the Internet: <URL: http://oss.sgi.com/projects/ogl-sample/registry/NV/register_combiners2.txt>.

Kilgard, Mark J. NV_texture_shader [online]. Nov. 26, 2001 [retrieved on Aug. 19, 2002].pp. 1-55. Retrieved from the Internet:<URL: http://oss.sgi.com/projects/ogl-sample/registry/NV/texture_shader.txt>.

Kilgard, Mark J. NV_texture_shader2 [online]. Apr. 13, 2001 [retrieved on Aug. 19, 2002]. pp. 1-10. Retrieved from the Internet:<URL: http://oss.sgi.com/projects/ogl-sample/registry/NV/texture_shader2.txt>.

Kilgard, Mark J. NV_vertex_program (version 1.6) [online]. Feb. 25, 2002 [retrieved on Aug. 19, 2002]. pp. 1-72. Retrieved from the Internet:<URL: http://oss.sgi.com/projects/ogl-sample/registry/NV/vertex_program.txt>.

(Continued)

*Primary Examiner*—Ulka J. Chauhan
*Assistant Examiner*—Enrique L. Santiago
(74) *Attorney, Agent, or Firm*—Fenwick & West LLP

(57) ABSTRACT

User-defined shaders are constructed from fragments. The shaders are identified by tags. At run-time, the tag is used to determine whether the user-defined shader has been previously compiled. If it has, the compiled version is executed. If it has not, the fragments are assembled to form the shader and the shader is run-time compiled. The compiled shader can be stored for subsequent reuse, with the tag serving as an index to the compiled version.

34 Claims, 5 Drawing Sheets

OTHER PUBLICATIONS

Gosselin, Dave and Hart, Evan. EXT__vertex__shader (revision 1.00) [online]. Aug. 20, 2001 [retrieved on Aug. 19, 2002]. pp. 1-23. Retrieved from the Internet:<URL: http://oss.sgi.com/projects/ogl-sample/registry/EXT/vertex__shader.txt>.

Kilgard, Mark J. NV__texture__shader3 [online]. Nov. 15, 2001 [retrieved on Aug. 19, 2002]. p. 1-18. Retrieved from the Internet:<URL: http://oss.sgi.com/projects/ogl-sample/registry/NV/texture__shader3.txt>.

Kilgard, Mark J. NV__vertex__program1__1 (Version 1.0) [online]. Nov. 28, 2001 [retrieved on Aug. 19, 2002]. pp. 1-8. Retrieved from the Internet:<URL: http://oss.sgi.com/projects/ogl-sample/registry/NV/vertex__program1__1.txt>.

Kirk, David. nVidia: GeForce3 Architecture Overview. Presentation [online]. Undated [retrieved on Aug. 19, 2002]. pp. 1-22. Retrieved from the Internet:<URL: http://developer.nvidia.com/docs/IO/1271/ATT/GF3ArchitectureOverview.pdf>.

nVidia web page. Developer Relations, NVLink v2.3 [online]. Last updated Mar. 13, 2002 [retrieved on Aug. 19, 2002]. pp. 1-2. Retrieved from the Internet:<URL: http://developer.nvidia.com/view.asp?IO=nvlink__2__1<.

nVidia web page. Developer Relations, NVASM Version 1.42 [online] [retrieved on Aug. 19, 2002]. pp. 1-2. Retrieved from the Internet:<URL: http://developer.nvidia.com/view.asp?IO=nvasm>.

Microsoft Windows CE.NET: Power of Direct3D [online]. Web page, last updated on May 31, 2002 [retrieved on Aug. 19, 2002]. pp. 1-2. Retrieved from the Internet:<URL: http://msdn.microsoft.com/library/default.asp?url=/library/en-us/wced3d/htm/__wcesdk__dx3d__the __power__of__direct3d.asp>.

Dietric, Sim. Dx8 Pixel Shaders. Presentation [online]. Undated [retrieved on Aug. 19, 2002]. pp. 1-46. Retrieved from the Internet:<URL: http://developer.nvidia.com/docs/IO/1305/ATT/GDC2KI__DX8__Pixel__Shaders.pdf>.

Huddy, Richard. nVidia: Introduction to Vertex Shaders. Presentation [online]. Undated [retrieved on Aug. 19, 2002]. pp. 1-39. Retrieved from the Internet:<URL: http://developer.nvidia.com/docs/IO/1366/ATT/Introduction__DX8__Vertex__Shaders.pdf>.

CG Language Specification [online]. Jun. 2002 [retrieved on Aug. 19, 2002]. pp. 1-33. Retrieved from the Internet:<URL: http:/developer.nvidia.com/docs/IO/2877/ATT/Cg__Specification.pdf>.

The RenderMan Interface Specification, Version 3.1 [online]. Pixar web page, Sep. 1989 (with typographical corrections through May 1995) [retrieved on Aug. 19, 2002]. pp. 1-3. Retrieved from the Internet:<URL: http://www.pixar.com/renderman/developers__corner/rispec/rispec__3__1/index.html>.

* cited by examiner 201 200

FIG. 2

```
!!VP1.0
//Fragment 1
//transform the vertex position by the concatenated modelview
and projection matrixes
      DP4 o[HPOS].x, c[0], v[OPOS];
      DP4 o[HPOS].y, c[1], v[OPOS];
      DP4 o[HPOS].z, c[2], v[OPOS];
      DP4 o[HPOS].w, c[3], v[OPOS];
//Fragment 2
//pass through the vertex texture coordinate 0
      MOV o[TEX0], v[TEX0];
//Fragment 3
//pass through the vertex primary color
      MOV o[COL0], v[COL0];
//Fragment 4
//compute the eye-space vertex position-multiply by the
modelview matrix
      DP4 R8.x, v[OPOS], c[4];
      DP4 R8.y, v[OPOS], c[5];
      DP4 R8.z, v[OPOS], c[6];
      DP4 R8.w, v[OPOS], c[7];
//Fragment 5
//Create R_EYE_VECTOR, the normalized vector from the eye to
the vertex
      DP3 R3.w, R8, R8;
      RSQ R3.w, R3.w;
      MUL R3, R8, R3.w;
//Fragment 6
//Transform normal to eye-space-multiply by the inverse
transpose of the modelview matrix
      DP3 R9.x, v[NRML], c[8];
      DP3 R9.y, v[NRML], c[9];
      DP3 R9.z, v[NRML], c[10];
//Fragment 7
//Re-normalize normal
      DP3 R9.w, R9, R9;
      RSQ R9.w, R9.w;
      MUL R9, R9, R9.w;
//Fragment 8
//Calculate Reflection Vector R5=E-2*(E dot N)*N
      DP3 R4, R3, R9;
      ADD R4, R4, R4;
      MUL R9, R9, R4;
      ADD R5, R3, -R9;
//Assign the reflection vector R5 into the cubemap texture
coordinate
      DP3 o[TEX1].x, c[12], R5;
      DP3 o[TEX1].y, c[13], R5;
      DP3 o[TEX1].z, c[14], R5;
//Assign a constant scaling factor to the cubemap scalar
      MOV o[TEX1].w, c[16].x;
      END
```

211A (Fragment 1), 211B (Fragment 2), 211C (Fragment 3), 211D (Fragment 4), 211E (Fragment 5), 211F (Fragment 6), 211G (Fragment 7), 211H (Fragment 8), 202 (END)

EFFICIENT USE OF USER-DEFINED SHADERS TO IMPLEMENT GRAPHICS OPERATIONS

BACKGROUND OF THE INVENTION

1. Field of the Invention

This invention relates generally to computer graphics and, more particularly, to user-defined shaders that implement graphics operations.

2. Description of the Related Art

Ever since 3D computer graphics evolved beyond wire-frame rendering, shading has been a principal area of research and development. In the early days, shading primarily concerned processes by which pixel colors were applied to a surface. These days, the terms shading and shader are much broader and generally refer to any types of 3D graphics operation. Code which implements such graphics operations is commonly referred to as a shader. Examples of graphics operations that can be implemented by shaders include coordinate transformation, lighting, and determining the pixel colors across a surface. Shaders can also be used to produce geometric effects, such as skeletal animation, particle systems, or other dynamics such as textile modeling. Shaders are widely used for simulating the reflectance properties of surfaces, ranging from simple shaders describing a pattern on a surface to more sophisticated shaders modeling human skin, granite, velvet, etc. Shaders can also be used to simulate the optics in a camera lens through which a scene is viewed or to simulate the illumination properties of lights in a scene. Other examples will be apparent.

In 1988, Pixar's Renderman renderer became available. Renderman was the first widely used rendering application that supported programmable shading, although the technique was introduced commercially by Pixar with their Chap Reyes rendering system in 1986 and academically by Robert L. Cook in 1984 ("Shade Trees", Robert L. Cook, Computer Graphics Siggraph 1984 proceedings). Prior to programmable shading, a user of a graphics system (e.g., an applications developer) was limited to a predefined set of shading operations, which shall be referred to as "standard operations." All graphics had to be rendered using only the standard operations. If an effect was not supported by the standard operations, then the user either had to skip the effect or, if the effect was important enough, lobby the manufacturer of the graphics system to expand the set of standard operations to include the desired effect. In contrast, programmable shading allowed users to mathematically define shading functions using their own code. This resulted in a nearly infinite number of shading possibilities to simulate virtually every conceivable type of surface, lighting, atmosphere or other effect. Essentially, users could define their own shaders.

The shading techniques described above were typically first implemented as software running on general purpose computers. Such rendering software is generally used for off-line rendering, in which rendering times for each frame of a computer graphics movie can vary from seconds to days, depending on the processor performance and scene complexity. Later, as semiconductor performance increased, many shading techniques were implemented in hardware for real-time applications. In real-time applications, scenes must be rendered at interactive rates, which is usually somewhere between 10 and 100 Hz.

Due to the difficulty in meeting this performance requirement, advances in shading technology are implemented in off-line rendering systems significantly before they reach real-time renderingsystems. For example, an early implementation of real-time texture mapping occurred in the 1980's in General Electric's CompuScene III real time image generator. An early implementation of rudimentary real-time programmable shading was nVidia's Geforce3 accelerator, released in 2001. These dates are significantly later than the corresponding dates for off-line rendering systems.

Like their off-line rendering ancestors, prior to programmable shading, real-time graphics systems were based upon a predefined set of standard operations and a corresponding application programming interface (API). This predefined set of operations is also known as the fixed-function pipeline. It will also be referred to as the fixed-function mode for the graphics system. Examples of APIs that include a fixed function pipeline are OpenGL 1.1 and DirectX. Older APIs include IRISGL (SGI's API prior to OpenGL), Glide (by 3dfx), and PHIGS. The OpenGL specification describes a pipelined architecture for real-time 3D rendering. The pipeline includes stages for vertex processing, primitive processing, rasterization, texture mapping, and fragment processing. Each stage in the pipeline can implement a finite number of standard operations and the operations to be performed are described by states that are set by the user (including, for example, matrices, and lighting and material parameters).

For example, in the geometry processing stage (a combination of vertex processing and primitive assembly), the user might set state(s) to describe how texture coordinates are generated. Texture coordinates may, for example, be explicitly specified in source geometry, derived by means of a linear equation from the vertex positions of source geometry, transformed by a matrix, etc. The user sets the appropriate state(s) for the generation of texture coordinates and the graphics processor then executes the corresponding standard operation(s).

One important property of the standard operations is that they are typically "orthogonal." Two graphics operations are orthogonal if the state of one operation does not affect the state of the other operation. For example, consider texture coordinate generation and texture coordinate transformation. The former describes how texture coordinates are initially generated; the latter describes a matrix transformation applied to the coordinates. These two operations are orthogonal because the transformation operation functions the same regardless of how the texture coordinates are initially generated, and vice versa.

One advantage of orthogonality for users is that it simplifies the use of the graphics system because the interplay between different graphics operations is reduced. This makes it easier to understand the graphics system and also makes incremental development possible. One disadvantage of orthogonality for manufacturers of graphics systems is that each additional graphics operation supported by the fixed function pipeline geometrically increases the number of combinations of possible states that the user may set.

Take the geometry processing stage as an example. Here, the addition of new graphics operations and the corresponding proliferation of states have led to the adoption of "fast paths." Modern geometry processing stages are typically implemented using programmable processors that execute microcode. The microcode implements the standard operations of the geometry processing stage of the fixed function pipeline. It is fixed function because the user cannot easily alter the microcode (e.g., it may be preloaded by the graphics system manufacturer) and therefore can only perform the standard operations supported by the microcode. The microcode authors usually start by creating a "slow path," which is an all-inclusive microprogram that is capable of handling every possible combination of states supported by the fixed function pipeline. This generalized microprogram is not optimized. For example, if the user disables texture coordinate transformation, rather than skipping this operation, the generalized microprogam typically would still perform the coordinate transformation but set the transformation matrix to the identity matrix so that no actual coordinate transformation occurred.

Because most applications use only a small subset of the possible combinations of states, the microcode authors often implement "fast path" microprograms for specific cases. For example, if flat-shaded wireframe rendering is used frequently in CAD applications, the authors may create an optimized microprogram to implement this combination of states more efficiently. Or if a popular computer game renders textured polygons with one diffuse light and fog enabled, the authors may create another optimized microprogram to implement this combination. The graphics driver typically chooses the appropriate fast path by analyzing the state settings made by the application. If no fast path is available, the generalized slow path is executed.

The programmable pipeline or programmable mode goes one step further. In the fixed function mode, the user sets states and, based on the states, a fast path microprogram is executed if one is available. In the programmable mode, the user supplies his own microprogram (i.e., a user-defined shader). The programmable pipeline simplifies the graphics system manufacturer's job because the user (e.g., an application developer) can create shaders optimized for his particular application and can also create shaders to implement graphics operations which are not supported by the fixed function pipeline. Furthermore, the user does this without affecting the fixed function pipeline or the corresponding graphics API. Early examples of the programmable pipeline include Direct3D Vertex Shaders (a.k.a. Vertex Programs in OpenGL) and Direct3D Pixel Shaders (a.k.a. Texture Shaders and Register Combiners in OpenGL). These allow the user to write shaders (vertex shaders and pixel shaders in the examples given above) that essentially bypass the API abstraction layer and operate directly with the underlying graphics hardware (or which are optimized to run on general CPUs if there is no direct hardware support).

While the programmable pipeline gives users the flexibility to create custom shaders, it comes at a price. FIG. 1A (prior art) is a functional diagram of a graphics system 150 with a fixed function mode 160 and a programmable mode 170. Typically, the programmable pipeline 170 and the fixed function pipeline 160 are mutually exclusive. Using the programmable pipeline 170 means that many of the standard operations of the fixed function pipeline 160 are not available. For example, when a Direct3D Vertex Shader is enabled, it completely replaces the vertex processing stage of the fixed function pipeline. Suppose a user simply wants to implement a new method for deriving texture coordinates from source geometry and uses the programmable pipeline to do so. By invoking the programmable pipeline for this one operation, the user can no longer take advantage of the texture matrix, geometry transformation, lighting, or any other standard vertex operations available from the fixed function pipeline. Rather, the user must supply all of these operations himself in additional user-defined shaders. In the case of Vertex/Pixel Shaders, some non-programmable functions of the fixed function pipeline, such as clipping and depth testing, remain when the programmable pipeline is invoked.

In other words, using shaders and the programmable pipeline shifts the burden of managing many of the features of the graphics pipeline from the graphics system manufacturer to the user. The problem of proliferating graphics operations and states now becomes the user's problem. As a result, there is a substantial barrier to entry to using shaders and there is a need for an approach which allows users to take advantage of the flexibility of the programmable pipeline while significantly reducing this barrier to entry.

SUMMARY OF THE INVENTION

The present invention overcomes the limitations of the prior art by providing user-defined shaders that are constructed from fragments. The shaders are identified by tags. At run-time, the tag is used to determine whether the user-defined shader has been previously compiled. If it has, the compiled version is executed. If not, the fragments are assembled to form the shader and the shader is run-time compiled. The compiled shader can be stored for subsequent reuse, with the tag serving as an index to the compiled version.

The present invention is particularly advantageous because it provides a way for real-time graphics applications to be constructed using programmable shading technology while maintaining the advantages of orthogonality. Furthermore, it provides the automatic creation of "fast-paths" for different combinations of states. It also allows users to use multiple shaders in tandem, as well as combine shaders with functionality equivalent to that provided by the fixed function pipeline. This approach also scales efficiently as the number of possible shaders multiplies exponentially. It is applicable to graphics applications based on a variety of application architectures, including scene graphs.

Specific implementations may include one or more of the following variations. In one variation, the tag includes a state vector indicating which fragment(s) are included in the shader. In another variation, a table contains records that associate previously compiled shaders with their corresponding tags. The table is consulted to determine whether it contains the tag of the current shader. If it does, it means there is a previously compiled version. If it does not, after compiling the current shader, its tag is added to the table. In one implementation, the table is a hash table. In another variation, the shader and tag represent the combination of two or more constituent shaders that are to be applied to an object.

In another aspect of the invention, a system for compiling user-defined shaders for implementing graphics operations includes control logic, a library of fragments and a fragment assembler. The control logic determines, based on the tag identifying the shader, whether the shader has been previously compiled. The fragment assembler communicates with the control logic and can access the library of fragments. If the shader has not been previously compiled, the fragment assembler assembles the fragment(s) included in the shader. The system optionally also includes a run-time compiler that compiles the assembled fragment(s).

In another aspect of the invention, a library of fragments is for building user-defined shaders which are compatible with a predefined set of standard operations (e.g., as for a fixed function pipeline). For those graphics operations that are implemented by both a standard operation and by the library of fragments, there is a substantial one to one correspondence between the standard operations and fragments in the library.

In yet another aspect of the invention, a set of graphics operations is to be performed by a graphics system having a programmable mode and a fixed function mode. The fixed function mode is for performing a predefined set of standard operations. The programmable mode is capable of executing user-defined shaders. It is determined whether the set of graphics operations is to be executed in programmable mode or in fixed function mode. If the fixed function mode is selected, the appropriate standard operations are executed. If the programmable mode is selected, the appropriate user-defined shader is executed using the techniques described above. In one implementation, a state vector identifies the specific graphics operations to be performed and the state vector is used to determine whether the set of graphics operations can be implemented by one or more standard operations.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 2 is an example of a user-defined shader built from fragments.

DETAILED DESCRIPTION OF THE PREFERRED EMBODIMENTS

Figure 1A:
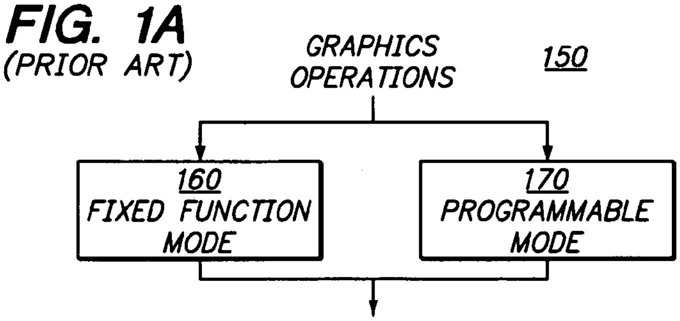
FIG. 1A (prior art) is a functional diagram of a graphics system with a fixed function mode and a programmable mode for executing graphics operations.
Figure 1B:
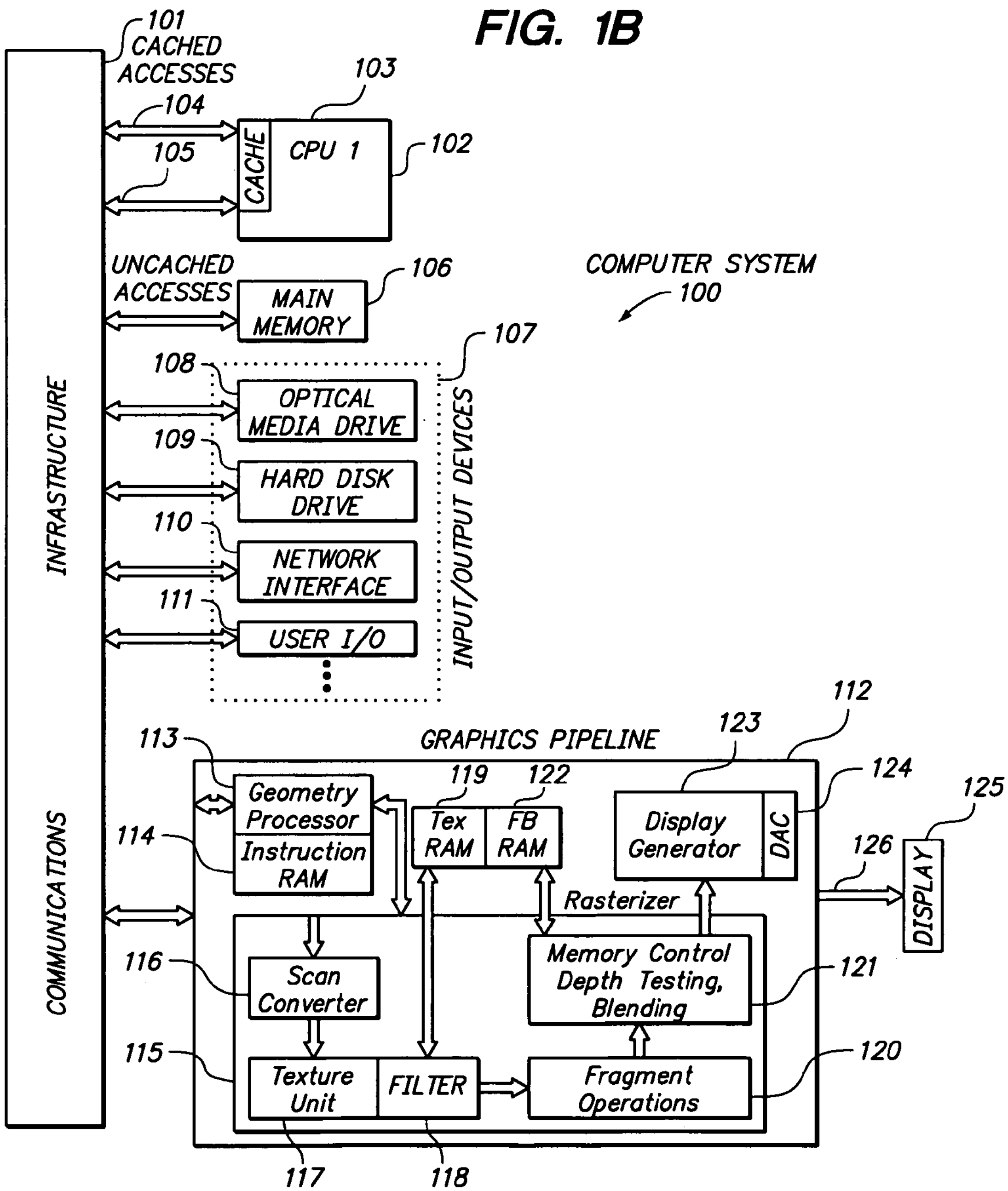
FIG. 1B is a diagram of a system equipped with a three-dimensional graphics pipeline suitable for use with the present invention.

FIG. 1B is a diagram of a system equipped with a three-dimensional graphics pipeline 112 suitable for use with the present invention. The graphics pipeline is one embodiment of a three-dimensional renderer or a real-time three-dimensional renderer. Computer system 100 may be used to render all or part of a scene generated in accordance with the present invention. This example computer system is illustrative of the context of the present invention and is not intended to limit the present invention. Computer system 100 is representative of both single and multi-processor computers.

Computer system 100 includes one or more central processing units (CPU), such as CPU 102, and one or more graphics subsystems, such as graphics pipeline 112. One or more CPUs 102 and one or more graphics pipelines 112 can execute software and/or hardware instructions to implement the graphics functionality described herein. Graphics pipeline 112 can be implemented, for example, on a single chip, as part of CPU 102, or on one or more separate chips. Each CPU 102 is connected to a communications infrastructure 101, e.g., a communications bus, crossbar, network, etc. Those of skill in the art will appreciate after reading the instant description that the present invention can be implemented on a variety of computer systems and architectures other than those described herein.

Computer system 100 also includes a main memory 106, such as random access memory (RAM), and can also include input/output (I/O) devices 107. I/O devices 107 may include, for example, an optical media (such as DVD) drive 108, a hard disk drive 109, a network interface 110, and a user I/O interface 111. As will be appreciated, optical media drive 108 and hard disk drive 109 include computer usable storage media having stored therein computer software and/or data. Software and data may also be transferred over a network to computer system 100 via network interface 110.

In one embodiment, graphics pipeline 112 includes frame buffer 122, which stores images to be displayed on display 125. Graphics pipeline 112 also includes a geometry processor 113 with its associated instruction memory 114. In one embodiment, instruction memory 114 is RAM. The graphics pipeline 112 also includes rasterizer 115, which is communicatively coupled to geometry processor 113, frame buffer 122, texture memory 119 and display generator 123. Rasterizer 115 includes a scan converter 116, a texture unit 117, which includes texture filter 118, fragment operations unit 120, and a memory control unit (which also performs depth testing and blending) 121. Graphics pipeline 112 also includes display generator 123 and digital to analog converter (DAC) 124, which produces analog video output 126 for display 125. Digital displays, such as flat panel screens can use digital output, bypassing DAC 124. Again, this example graphics pipeline is illustrative of the context of the present invention and not intended to limit the present invention.

FIG. 2 is an example of a user-defined shader 200 according to the invention. Throughout this disclosure, the term "user-defined" is used merely to indicate that shader 200 is enabled by the programmable pipeline and to distinguish shader 200 from code that is "hard-wired" into the graphics system as part of the fixed function pipeline. It is not meant to imply that shader 200 must be coded or provided by a "user." For example, the graphics system manufacturer may provide shaders for use with the programmable pipeline and the term "user-defined shaders" is meant to include these shaders.

Shader 200 is an example written in the assembly language used in nVidia OpenGL Vertex Programs. In alternate embodiments, the shader may be written in other assembly languages or in a higher level shading language such as those supported by compilers such as the Stanford Shading Compiler or SGI's OpenGL Shader system. The vertex shader 200 computes the per-vertex attributes for cubic reflection mapping. For the purposes of this example, the shader 200 has been decomposed into eight shader fragments 211A–211H, surrounded by a standard header 201 and footer 202. Generally speaking, user-defined shaders can include one or more shader fragments. One advantage of defining shaders as a combination of shader fragments is that shader fragments can be reused. They also simplify the process of combining shaders, as will be further explained below.

In shader 200, the three fragments 211A–C implement graphics operations which are part of the fixed function pipeline (i.e., they implement standard operations). It is also expected that many different user-defined shaders will use these shader fragments. The four fragments 211D–G implement graphics operations which do not map uniquely to any part of the fixed function pipeline but which are expected to be frequently used in other shaders nonetheless. Fragment 211H is specific to this shader 200 and it is unlikely that other shaders would use this code.

Shaders can be decomposed into shader fragments in more than one way. For example, shader 200 could have been decomposed into a different number of shader fragments and/or differently defined shader fragments. The decomposition of a shader into its constituent fragments can be done by hand but preferably is automated. For example, nVidia's NVASM shader assembler is advertised as being able to perform this task. Shaders preferably will be decomposed into shader fragments in a manner that permits significant reuse of shader fragments, fast compilation, combining and execution of shaders, and consistency between shader fragments and the standard operations of the fixed function pipeline (see FIG. 8 below). Put in another way, the shaders used in an application are built up from a library of shader fragments and the library preferably is selected to achieve the goals described above. The library itself may be entirely coded from scratch by the user, contain previously coded libraries (either personal or possible commercially available ones) or both.

In decomposing shaders into their constituent fragments, several issues typically are important. First, it is important to identify conflicts between different shaders. For example, two shaders might use the same texture coordinate for different purposes or in an inconsistent manner. These conflicts typically must be resolved before the shaders are compiled and preferably before run time. If the conflict between the shaders cannot be resolved through automated means, then human intervention may be required to resolve the conflict. It is even possible that the conflict is unresolvable, meaning that the shaders cannot both be used and an alternate solution is required. Second, in order to increase the modularity of the shader fragments, it is important to identify commonalities and differences between the shaders. Commonly used graphics operations preferably are coded once as a single fragment that will be included in multiple shaders. Fragments 211A–G are examples of this type of fragment. Differences are coded as fragments that are unique to one shader. In the example of FIG. 2, fragment 2111H is a shader-specific fragment.

As mentioned previously, the use of shaders and the programmable pipeline has many advantages. For example, the programmable pipeline has more flexibility and freedom, allowing the user to implement new graphical effects. The flexibility of vertex shaders allows users to implement graphics operations such as procedural geometry (e.g., cloth simulation and soap bubbles), advanced vertex blending for skinning and vertex morphing (i.e., tweening), particle systems, advanced lighting models, advanced keyframe interpolation (e.g., for complex facial expressions and speech), and real-time modifications of the perspective view (e.g., lens effects). Another advantage is that shaders can be more portable than applications based on the fixed function pipeline. The shader approach can more easily take advantage of advances in hardware capability and the addition of new instructions and registers.

Figure 3:
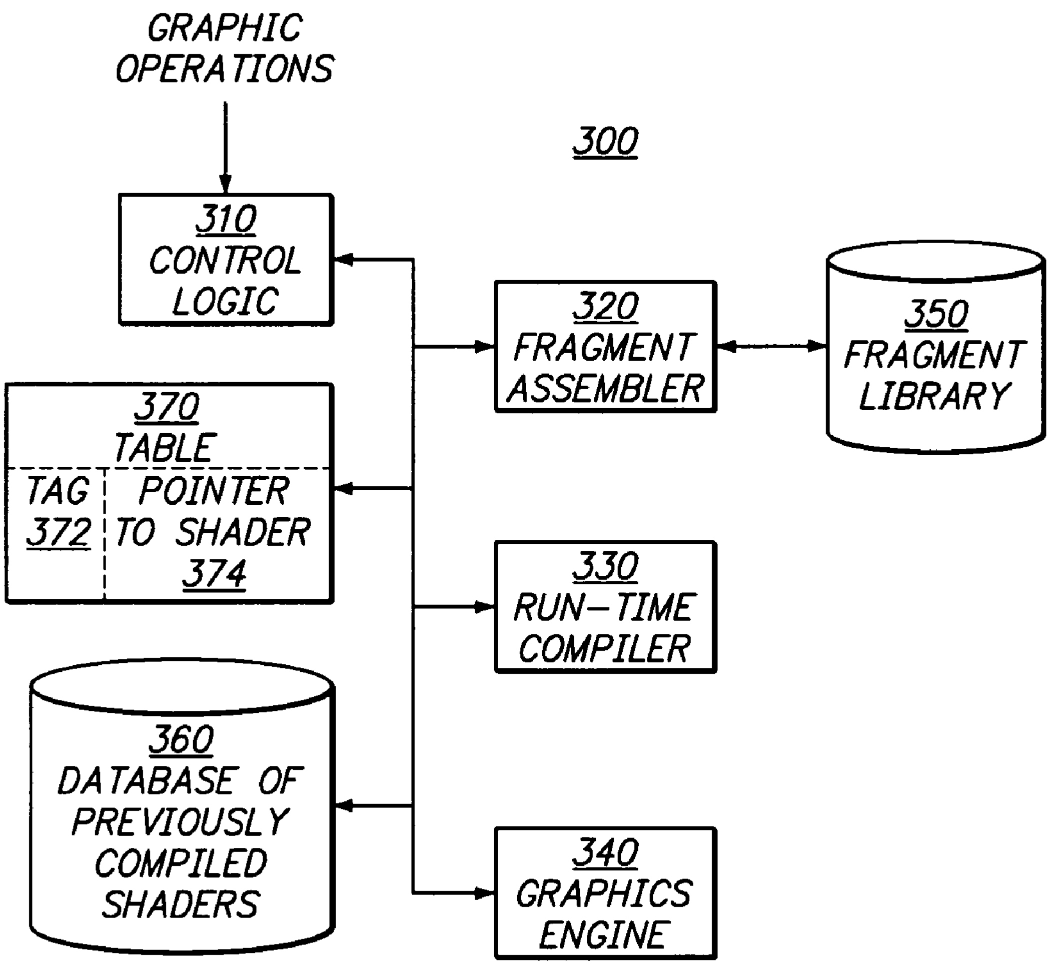
FIG. 3 is a block diagram of an architecture for compiling and executing shaders.
Figure 4:
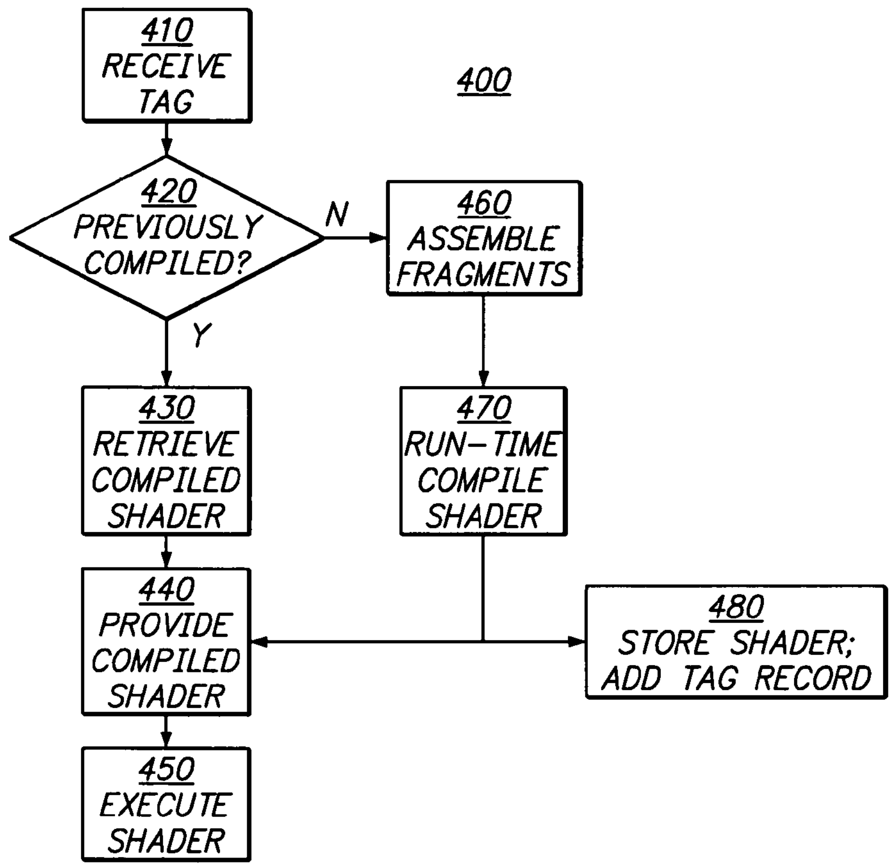
FIG. 4 is a flow diagram illustrating operation of the architecture of FIG. 3.

FIG. 3 is a block diagram of an architecture 300 for compiling and executing shaders according to the invention. FIG. 4 is a flow diagram illustrating the operation of architecture 300. The architecture 300 includes control logic 310, a fragment assembler 320, a run-time compiler 330 and a graphics engine 340. The architecture 300 also includes the following data structures: a library 350 of shader fragments, a database 360 of previously compiled shaders and, optionally, a table 370 that indexes the contents of database 360.

In FIG. 3, with the exception of the fragment library 350, all of the components are shown as being able to communicate with each other and the picture suggests some sort of bus-like communications mechanism. Fragment library 350 is shown as being accessible only by the fragment assembler 320. These communications links are shown for convenience and are not intended to limit the architecture 300 to certain implementations. Alternate embodiments may couple the components in a different manner and/or use different communications mechanisms.

First consider each component individually. The control logic 310 generally controls the process of compiling and executing shaders, in this example according to method 400. The control logic 310 does not necessarily have sole control over the entire process. At various points, control may be shared or transferred to other components. In some embodiments, the control logic 310 may also detect and/or resolve conflicts at run time. It may also combine multiple shaders into a larger shader and then execute the larger shader (which shall be referred to as a composite shader) instead of the many constituent shaders. For example, if multiple shaders are to be applied to the same object, the control logic 310 might construct a single composite shader that has the same effect as the original multiple shaders. The fragment assembler 320 is responsible for assembling shaders to be executed from their constituent fragments. The run-time compiler 330 is responsible for compiling shaders at run time. The graphics engine 340 executes the compiled shaders.

With respect to implementation, graphics engine 340 typically is implemented in hardware, although it could be a software implementation or a combination of hardware and software (e.g., a chip and a low level driver). Examples of graphics engine 340 include graphics processors, DSPs and general-purpose microprocessors (especially if optimized for graphics processing or coupled with graphics drivers). The three components 310, 320, 330 typically are implemented in software. This software could run on the graphics engine 340 or on other processors.

Turning to the data structures, the fragment library 350 is a data structure that contains the shader fragments that will be used to build shaders. The compiled shaders database 360 contains shaders which have been previously compiled. The table 370 is an index into the compiled shaders database 360. In one implementation, each shader is identified by a tag and each record in table 370 lists a tag 372 and a pointer 374 to the location in database 360 of the corresponding compiled shader. The data structures 350, 360 and 370 are referred to as library, database and table, but this is solely for convenience. They can be implemented using any appropriate type of data structures, including for example arrays, linked-lists or hash tables.

FIG. 4 is a flow diagram 400 illustrating the execution of an application using architecture 300. The application includes a number of shaders that are to be compiled and executed. In 410, the control logic 310 "receives" a tag identifying a shader that is to be executed. This could occur in a number of ways. For example, the application itself could be coded as a series of tags indicating which shaders are to be executed in what order. Alternately, the application could be coded as a series of states, as is the case with the fixed function pipeline, and control logic 310 then converts the states into the corresponding tags or uses the states as the tags. As a final example of receiving 410 the tag, if multiple shaders are to be combined into a composite shader, the control logic 310 might receive identifiers for each of the constituent shaders and construct the tag for the composite shader. The control logic 310 might also check for conflicts between shaders and attempt to resolve any detected conflicts. In any event, control logic 310 receives an indication of which shader is to be executed next and the shader is identified by a corresponding tag.

The tag can also take different forms. It can be a descriptive label or some other name, for example "Lighting" for a shader that implements lighting. In an alternate embodiment, the tag includes a state vector that indicates which fragments are included in the shader. For composite shaders, the tag may define the shader by identifying its constituent shaders.

Once the control logic 310 receives 410 the tag, it determines 420, based on the tag, whether the corresponding shader has been previously compiled. In architecture 300, the records in table 370 contain the tags for shaders that have been previously compiled. In this case, control logic 310 references the table 370 and determines whether the tag for the current shader is already contained in table 370. If it is, then the shader has been previously compiled. The control logic 310 retrieves 430 the previously compiled shader from database 360 and provides 440 the compiled shader to the graphics engine 340, which executes 450 the shader in real time.

If the tag is not in table 370, the shader must be compiled before it can be executed. In this case, the control logic 310 instructs the fragment assembler 320 to retrieve the appropriate fragments from fragment library 350 and assemble 460 the fragments in the correct order. The fragment assembler 320 may also add syntax such as headers and footers.

The run-time compiler 330 compiles 470 the assembled shader and provides 440 the compiled shader to the graphics engine 340 for execution 450 in real time. The control logic 310 also stores 480 the compiled shader in database 360 and adds 480 a corresponding record to table 370. Hence, if the same shader is encountered later, it can be retrieved from the database 360 rather than recompiled.

Method 400 is applied to each shader in the application. If the implementation is pipelined, multiple shaders can be processed concurrently.

Figure 5:
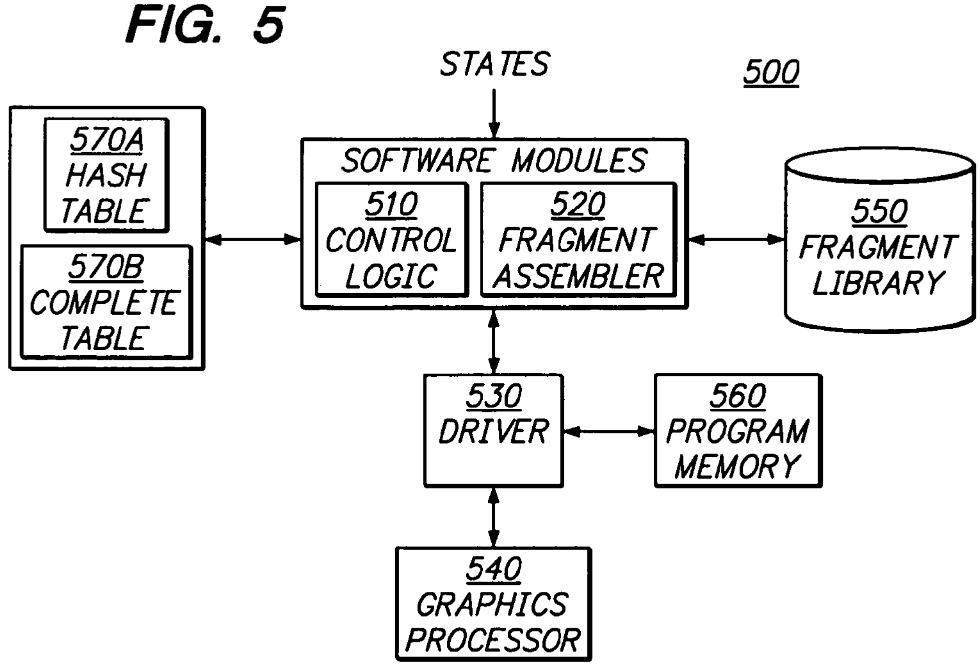
FIG. 5 is a block diagram of one implementation of the architecture of FIG. 3.

FIG. 5 is one example implementation 500 of architecture 300. This implementation is based on a computer system equipped with a programmable graphics engine. In this example, the implementation is compliant with the Direct3D and OpenGL specifications. The graphics engine 340 is an nVidia GeForce3 graphics processor 540. The manufacturer provides a low-level driver 530 which is executed by the system CPU (not shown in FIG. 5) and facilitates all communication with graphics processor 540. The interface to the driver 530 is the OpenGL API (with nVidia extensions), which allows graphics operations to be executed either in fixed function mode or in programmable mode. The driver 530 also includes the run-time compiler 330. The control logic 310 and fragment assembler 320 are implemented as higher level user-defined software modules 510 and 520, which interface to the OpenGL driver 530.

The data structures are implemented as follows. In this system, shaders executed in the programmable pipeline are assigned handles, also known as id's. The compiled shaders are stored by driver 530 in program memory 560 and the handles are passed back to the user software module via the OpenGL API. In other words, the compiled shader database 360 is implemented in program memory 560 and maintained by driver 530. The tags for shaders are bit-based state vectors, as will be further described below, and table 370 associates the state vectors (i.e., tags) with the corresponding handles (i.e., pointers). If there are a large number of state vectors, a hash table 570A can be used to index into the complete table 570B. The control logic software 510 maintains the hash table 570A and the complete table 570B. The fragment library 350 is implemented as a library 550 of individual ASCII files, one file per fragment. The fragments are defined prior to run time and loaded into the fragment library 550 for use at run time.

Figure 6:
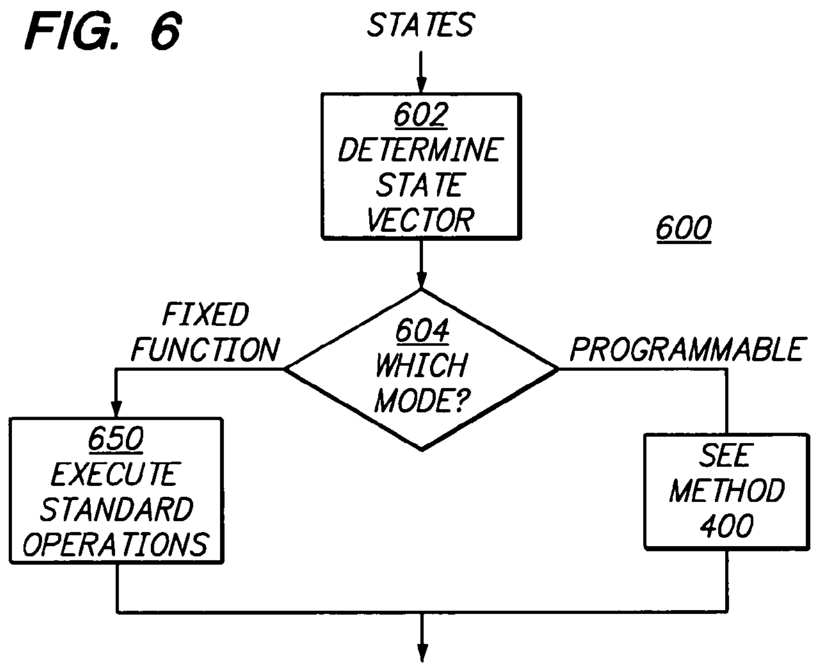
FIG. 6 is a flow diagram illustrating operation of the example implementation of FIG. 5.

System 500 includes a fixed function mode as well as a programmable mode. FIG. 6 is a flow diagram illustrating operation of both the fixed function mode and the programmable mode. The graphics operations requested by the user application are described by states, as described previously. These states can include both states associated with user-defined shaders and states associated with the fixed function pipeline. The states are received by the control software 510 which converts 602 them to the corresponding state vector.

In this implementation, the state vector is bit-based. Each bit (or group of bits) indicates whether certain shaders are enabled. For example, if there are 32 possible different shaders, the state vector could be a 32-bit state vector. Each bit corresponds to a shader, which in turn includes one or more fragments. The value of the bit indicates whether that shader (and the corresponding fragments) are included in the composite shader, thus representing over 4 billion ($2^{32}$) possible composite shaders. For example, bit 7=1 might indicate that shader 7 is included in the composite shader and bit 7=0 indicates that shader 7 is not included. If shader 7 includes fragments A, B and C, then bit 7=1 would cause fragments A, B and C to be included in the composite shader. If bit 7=0, fragments A, B and C will not be included unless another enabled shader calls for their inclusion. In an alternate embodiment, the shaders can be mapped to the state vector in different ways. In a common approach, multiple bits may be used to represent groups of shaders. For example, if the application is limited to one light in a scene, but there are three different shaders representing three different light types (e.g., directional diffuse, local specular/diffuse, and ambient only), then only two bits are needed to represent which light, if any, is enabled. For example, 00 could mean no lighting, 01 directional diffuse lighting, 10 local specular/diffuse, and 11 ambient only. Not all bits in the state vector need be assigned, thus allowing the future addition of new shaders and fragments. In a preferred embodiment, bits are used in order, starting with the least significant bit.

Each bit of the state vector is determined by querying or otherwise determining the state that the application has specified should be applied. In scenegraph applications, this data is readily available from a state manager or node data structure. In an application built directly on top of a lower-level graphics API such as OpenGL, it is possible to query the driver immediately prior to object rendering to obtain object state associated with the fixed-function pipeline, if the data is not available through more efficient means. The result of each state query is inserted into the corresponding bit(s) of the state vector.

In this implementation, the control software 510 also combines multiple shaders that are to be applied to the same object, forming a single state vector that represents all of the graphics operations to be applied to the object. In this process, fragments that appear in more than one shader typically will appear only once in the combined shader. Conflicts between shaders typically are resolved at this stage if they have not been resolved before run time. Fragment assembler 520 maintains information on which fragments are included in each shader, including any requirements on the order in which fragments must be executed. Fragments that are not required by any of the constituent shaders are not included in the composite shader, thus making the entire process more efficient.

Figure 7:
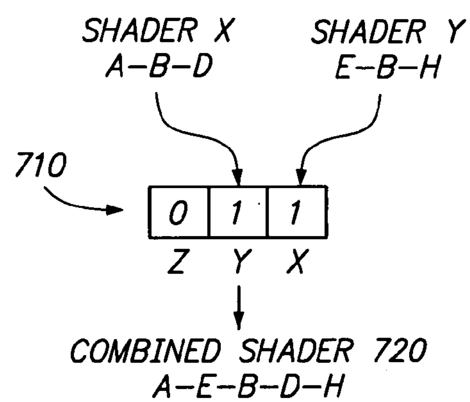
FIG. 7 is a diagram illustrating combining two shaders.

FIG. 7 is a diagram illustrating an example of combining shaders. For example, suppose that the state vector 710 is 3 bits long. Each bit represents a shader X-Z with the least significant bit representing shader X. Now suppose that the state is queried and it is determined that shaders X and Y are to be simultaneously applied to an object. If the control software 510 determines this is a valid combination (i.e. none of the requested shaders conflict), the resulting state vector 710 for the combined shader is 011, as shown in FIG. 7.

Returning to FIG. 6, the state vector for a shader (whether it be for a single shader or a composite shader) represents the graphics operations to be applied. The control software 510 determines 604, based on the state vector, whether the shader is to be executed using the fixed function pipeline or the programmable pipeline. In this implementation, if the state vector indicates that only standard operations are required (i.e., no custom shaders are enabled), the fixed function pipeline is used 650 to render the object.

If the programmable pipeline is used, execution proceeds according to FIG. 4. In particular, the state vector is hashed and compared 420 against the hash table 570. If there is a match, the corresponding handle is passed 430, 440 by the control logic 510 to the driver 530, which executes 450 the previously compiled shader.

If there is no match for the state vector, then the required shader is run-time compiled. The fragment assembler 520 retrieves and assembles 460 the fragments indicated by the state vector. In this implementation, the assembler 520 does so by traversing the list of fragments required if all shaders are enabled and assembling only those required by shaders enabled in the state vector. It is usually important to preserve the order of the fragments since some fragments may depend on the output of other fragments. If the vector state represents the combination of multiple shaders, the order of the fragments in the combined shader preferably is consistent with the order in the individual shaders. Continuing the example of FIG. 7, assume shader X requires fragments A, B, D in the order A-B-D, and shader Y requires fragments B, E, H in the order E-B-H. The composite shader 720 of A-E-B-D-H is consistent with the orderings in the constituent shaders. However, shaders A-B-D-E-H and A-H-D-B-E are not.

In compilation 470, a handle for the user-defined shader is requested from the driver 530 and the assembled fragments are handed to the driver 530. The driver 530 includes a run-time compiler that compiles 470 the shader, which can then be executed 450. The driver 530 also returns the handle to the control software 510.

The control software 510 indexes the state vector and corresponding handle into the hash table 570 for future use. Other objects in the same scene may reuse the compiled shader in the same frame and any object, including the original object, may reuse the compiled shader in subsequent frames. If all objects requiring the compiled shader disappear from view, the compiled shader may remain in the hash table 570 and program memory 560 (this is generally preferred). Alternately, a garbage collection scheme may be used to clean out shaders that are no longer needed. Because most graphics drivers that have a programmable mode automatically allocate scarce resources to shaders which are in use, it is generally more efficient to retain compiled shaders in case they are needed again later.

The process described above is repeated for each object in the scene that may have shaders applied. The various data structures are maintained on a global basis, rather than on a per-object basis, and may be used by multiple objects. It may be desirable to have multiple sets of data structures, corresponding to different sets of fragments. For example, one class of objects may have certain characteristics that are best served by a certain library of fragments, with its corresponding data structures 550, 560 and 570. Another class of objects may be better served by a different library of fragments, as opposed to expanding the first library to cover both classes of objects. This approach reduces the size of the state vectors and works well when the two libraries are significantly different.

Shader parameters, such as light colors, positions, bump-map scales, etc. are managed using a state management system in parallel with the fixed-function pipeline state management infrastructure of the application. For example, if the application uses a scenegraph with hierarchical state management (i.e., state attributes can be at any level in the graph), custom attributes for shader-specific parameters are added, and some fixed-function attributes may be supplemented with attributes that map the fixed-function parameters into parameters addressable by the shader engine (referred to as program parameters by nVidia's OpenGL Vertex Programs, for example). An example of states defined by the fixed-function pipeline is texture coordinate generation mode. A stock scenegraph supporting different texture coordinate generation modes includes a mechanism for keeping track of what texture coordinate generation mode is used for each object in the scene. States associated with specific user-defined shaders (e.g., index of refraction) are not known to such a stock scenegraph. The scenegraph is extended to support user-defined states. For an application using a scenegraph or other scene structure with leaf-node state management (such as SGI's IrisPerformer's geoState mechanism), additional parameters may be added to the "geoStates" to support user-defined shaders.

For the example of OpenGL Vertex Programs, states are passed to user-defined shaders through 96 program parameter registers, each of which comprises four IEEE floating-point components. Both fixed-function and user-defined states are mapped into this address space such that each shader fragment may access the parameters that affect its operation. The available shader parameter address space can be allocated as necessary for all the possible shader combinations. This is achieved by filling in the address space starting with zero with the parameters for all the shaders that may be used concurrently. If there are several disjoint sets of shaders, wherein each set describes some subset of all the shaders that may be used concurrently, each set may have its own parameter mapping. This is only necessary if the number of parameters needed by all the shaders exceeds the available address space.

Returning to FIG. 6, the determination 604 of whether to use the fixed function pipeline versus the programmable pipeline is made in this implementation based on the state vector. As a result, it is advantageous to select the user-defined shaders so that they overlap in functionality with the standard operations from the fixed function pipeline. In other words, there are certain graphics operations which will be implemented by both standard operations and by user-defined shaders. Preferably, for at least a substantial number of these graphics operations, there is a specific user-defined shader that corresponds directly to the standard operation.

For example, assume that there are three standard operations A, B and C, each of which has two subparts as follows:

| Standard Operation | Subparts |
|---|---|
| A | A1 + A2 |
| B | B1 + B2 |
| C | C1 + C2 |

These standard operations could be mapped to user-defined shaders as follows.

| Shader | Subparts |
|---|---|
| X | A1 + A2 |
| Y | B1 + B2 |
| Z | C1 + C2 |

Each shader X, Y and Z corresponds directly to one of the standard operations A, B or C. Alternately, the functionality could be implemented by the shaders T, U and V shown below, where there is not a direct correspondence between the shaders T, U and V and the standard operations A, B and C:

| Fragment | Subparts |
|---|---|
| T | A1 + B2 |
| U | B1 + C1 + C2 |
| V | A2 |

The one to one mapping to shaders X, Y and Z is generally preferred over the mapping to T, U and V.

Figure 8:
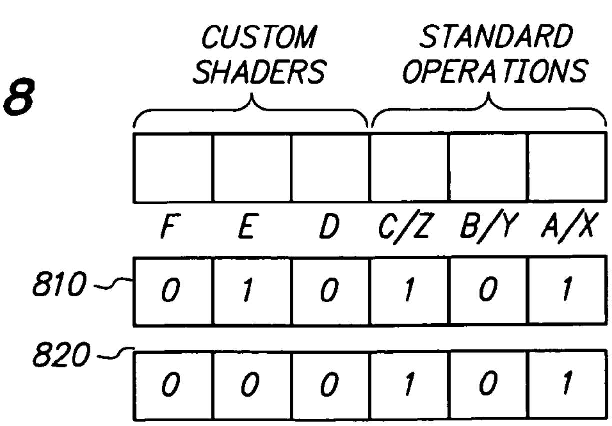
FIG. 8 is a diagram illustrating functional overlap between a library of shader fragments and the standard operations for a fixed function pipeline.

FIG. 8 is a diagram illustrating some of the advantages of one to one mapping. In FIG. 8, the 6 bit state vector represents the six graphics operations A–F. Graphics operations A–C are standard operations, each of which is available either through the fixed function pipeline or through user-defined shaders X–Z. Graphics operations D–F are implemented only as user-defined shaders and are not part of the fixed function pipeline. One advantage of one to one correspondence is that the state vector is shorter than what would be required if shaders T–V were used instead of X–Z.

State vector 810 requires graphics operations A, C and E. Since E is a user-defined operation, state vector 810 is executed via the programmable pipeline. The composite shader defined by shaders X, Z and E is executed. Now assume that the user (e.g., an applications programmer) makes a change to state vector 810 by disabling operation E. The resulting state vector 820 only requires operations A and C, both of which are standard operations. As a result, the state vector 820 can be executed by the fixed function pipeline. The transition from programmable pipeline to fixed function pipeline is efficient due to the one to one correspondence between fragments X–Z and standard operations A–C.

Although the invention has been described in considerable detail with reference to certain preferred embodiments thereof, other embodiments will be apparent. Therefore, the scope of the appended claims should not be limited to the description of the preferred embodiments contained herein. For example, the functionality described here can be implemented in various combinations of hardware and software, including implementation in software of different levels.

As another example, vertex shaders are used in many of the examples but other types of shaders are also suitable for use with the invention. For example, pixel shaders can be processed in an analogous manner. Furthermore, the invention can also be used with other shaders, such as clipping, fragment or camera projection shaders, including shaders which are not currently available today. If multiple types of shaders are in use, a correlation between different types of shaders can be established since there may be a correspondence between fragments. For example, if a pixel shader fragment for per pixel normal perturbation via a "bump map" texture is used, a corresponding vertex shader fragment may be required to set up the vertex parameters properly. As a result, it is possible to have different types of shaders share common bits in the shader state vector.

What is claimed is:

1. A method for compiling shaders for implementing graphics operations, at least one shader comprising two or more fragments, the method comprising:

determining, based on a tag that specifies one or more functions of the at least one shader, whether the shader has been previously compiled;

responsive to a determination that the shader has been previously compiled, retrieving the previously compiled shader;

responsive to a determination that the shader has not been previously compiled:

based on the tag, assembling the fragments included in the shader, the fragments implementing graphics operations that are part of the shader's function, and run-time compiling the assembled fragments, and providing the compiled shader for real-time execution on a graphics system.

2. The method of claim 1 wherein the shader comprises a combination of two or more constituent shaders.

3. The method of claim 2 wherein the constituent shaders are selected from a group consisting of transformation, lighting, texture coordinate generation, texture map application, and fog simulation.

4. The method of claim 1 wherein:

the shader comprises two or more constituent shaders, each constituent shader comprising at least one fragment; and the tag identifies the constituent shaders.

5. The method of claim 4 wherein the shader comprises two or more constituent shaders, the constituent shaders selected from a set of constituent shaders; and the tag includes a state vector that identifies which of the constituent shaders in the set of constituent shaders are included in the shader.

6. The method of claim 4 wherein the step of assembling the fragments included in the shader comprises:

assembling the fragments included in the constituent shaders.

7. The method of claim 1 wherein:

the step of determining, based on the tag, whether the shader has been previously compiled comprises:

determining whether the tag is contained in a table, the table having records associating previously compiled shaders with their corresponding tags; and further responsive to a determination that the shader has not been previously compiled:

adding a record to the table, the record associating the shader after compilation with its corresponding tag.

8. The method of claim 7 wherein the table comprises a hash table.

9. The method of claim 7 wherein each record comprises a handle for the previously compiled shader.

10. The method of claim 1 wherein the graphics system comprises a graphics processor.

11. The method of claim 1 wherein the graphics system has a programmable mode and a fixed function mode, wherein the fixed function mode is for performing graphics operations selected from a predefined set of standard operations and the programmable mode is capable of executing shaders.

12. The method of claim 11 wherein the graphics system is compliant with Direct3D.

13. The method of claim 11 wherein the graphics system is compliant with OpenGL.

14. The method of claim 11 wherein:

the shader comprises two or more constituent shaders, the constituent shaders selected from a set of constituent shaders; and for a substantial number of graphics operations that are implemented by both a standard operation and by the set of constituent shaders, there is a one to one correspondence between the standard operations and the constituent shaders in the set of constituent shaders.

15. The method of claim 1 wherein the shader is selected from a group consisting of vertex shaders and pixel shaders.

16. The method of claim 1 further comprising:

executing the compiled shader in real time.

17. A computer program product for compiling shaders for implementing graphics operations, at least one shader comprising two or more fragments, the computer program product comprising instructions to direct a processor to implement a method as in any of the claims 1–16.

18. A system for compiling shaders for implementing graphics operations, at least one shader comprising two or more fragments, the system comprising:

control logic for determining, based on a tag that specifies one or more functions of the at least one shader, whether the shader has been previously compiled;

a library of fragments; and a fragment assembler coupled to the control logic and capable of accessing the library of fragments for, responsive to a determination that the shader has not been previously compiled, based on the tag, assembling the fragments included in the shader, the fragments implementing graphics operations that are part of the shader's function.

19. The system of claim 18 further comprising:

a run-time compiler coupled to the fragment assembler for, responsive to a determination that the shader has not been previously compiled, run-time compiling the assembled fragments.

20. The system of claim 18 wherein the control logic is further for combining two or more constituent shaders to form the shader.

21. The system of claim 20 wherein the constituent shaders are selected from a group consisting of transformation, lighting, texture coordinate generation, texture map application, and fog simulation.

22. The system of claim 18 wherein:

the shader comprises two or more constituent shaders, each constituent shader comprising at least one fragment; and the tag identifies the constituent shaders.

23. The system of claim 22 wherein:

the shader comprises two or more constituent shaders, the constituent shaders selected from a set of constituent shaders; and the tag includes a state vector that identifies which of the constituent shaders in the set of constituent shaders are included in the shader.

24. The system of claim 22 wherein the fragment assembler is for, responsive to a determination that the shader has not been previously compiled, assembling the fragments included in the constituent shaders.

25. The system of claim 18 further comprising:

a table accessible by the control logic, the table having records associating previously compiled shaders with their corresponding tags; wherein:

the control logic determines whether the tag for the shader is contained in the table, and further responsive to a determination that the shader has not been previously compiled, the control logic adds a record to the table, the record associating the shader after compilation with its corresponding tag.

26. The system of claim 18 wherein the graphics system has a programmable mode and a fixed function mode, wherein the fixed function mode is for performing graphics operations selected from a predefined set of standard operations and the programmable mode is capable of executing shaders.

27. The system of claim 18 further comprising:

a second library of fragments, wherein the fragment assembler is further capable of accessing the second library of fragments and the shader is associated with one of the libraries.

28. A method for executing graphics operations on a graphics system having a programmable mode and a fixed function mode, wherein the fixed function mode is for performing graphics operations selected from a predefined set of standard operations and the programmable mode is capable of executing shaders, the method comprising:

determining whether a set of graphics operations is to be executed in programmable mode or in fixed function mode;

responsive to a determination that the set of graphics operations is to be executed in fixed function mode, performing one or more standard operations that implement the set of graphics operations; and responsive to a determination that the set of graphics operations is to be executed in programmable mode:

determining, based on a tag that specifies a function of a shader that implements the set of graphics operations, whether the shader has been previously compiled;

responsive to a determination that the shader has been previously compiled, retrieving and executing the previously compiled shader in real time; and responsive to a determination that the shader has not been previously compiled:

based on the tag, assembling fragments included in the shader, wherein the shader comprises two or more fragments, the fragments implementing graphics operations that are part of the shader's function, run-time compiling the assembled fragments, and executing the run-time compiled shader in real time.

29. The method of claim 28 wherein the graphics system is compliant with Direct3D.

30. The method of claim 28 wherein the graphics system is compliant with OpenGL.

31. The method of claim 28 wherein:

the shader comprises two or more constituent shaders, the constituent shaders selected from a set of constituent shaders; and for a substantial number of graphics operations that are implemented by both a standard operation and by the set of constituent shaders, there is a one to one correspondence between the standard operations and the constituent shaders in the set of constituent shaders.

32. The method of claim 28 wherein determining whether a set of graphics operations is to be executed in programmable mode or in fixed function mode comprises:

selecting fixed function mode if the set of graphics operations can be executed in fixed function mode.

33. The method of claim 28 wherein the set of graphics operations comprises at least one constituent shader; and the step of determining whether a set of graphics operations is to be executed in programmable mode or in fixed function mode comprises:

determining, based on a state vector that identifies the constituent shaders, whether the set of graphics operations can be implemented by one or more standard operations.

34. A computer program product for executing a set of graphics operations on a graphics system having a programmable mode and a fixed function mode, wherein the fixed function mode is for performing graphics operations selected from a predefined set of standard operations and the programmable mode is capable of executing shaders, the computer program product comprising instructions to direct a processor to implement a method as in any of the claims 28–33.

* * * * *